(12) United States Patent
Hiraga et al.

(10) Patent No.: US 11,656,079 B2
(45) Date of Patent: May 23, 2023

(54) SENSOR AND ELECTRONIC DEVICE (71) Applicant: KABUSHIKI KAISHA TOSHIBA, Tokyo (JP)

(72) Inventors: Hiroki Hiraga, Saitama Saitama (JP); Ryunosuke Gando, Yokohama Kanagawa (JP); Yasushi Tomizawa, Tokyo (JP); Fumito Miyazaki, Yokohama Kanagawa (JP); Daiki Ono, Yokohama Kanagawa (JP); Kei Masunishi, Kawasaki Kanagawa (JP); Etsuji Ogawa, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/445,922

(22) Filed: Aug. 25, 2021

(65) Prior Publication Data

US 2022/0276052 A1 Sep. 1, 2022

(30) Foreign Application Priority Data

Feb. 26, 2021 (JP) .............................. JP2021-029719

(51) Int. Cl.
*G01C 19/5677* (2012.01)
*G01C 19/5733* (2012.01)
*G01C 19/5726* (2012.01)

(52) U.S. Cl.
CPC ..... *G01C 19/5677* (2013.01); *G01C 19/5726* (2013.01); *G01C 19/5733* (2013.01)

(58) Field of Classification Search
None
See application file for complete search history.

(56) References Cited

U.S. PATENT DOCUMENTS

| 6,282,958 B1* | 9/2001 | Fell ................... G01C 19/5684 73/504.13 |
| 7,168,318 B2* | 1/2007 | Challoner .......... G01C 19/5684 73/504.12 |
| 2004/0055380 A1 | 3/2004 | Shcheglov et al. |
| 2006/0163679 A1 | 7/2006 | LaFond et al. |

(Continued)

FOREIGN PATENT DOCUMENTS

| JP | 5090929 B2 | 12/2012 |
| JP | 2018-163141 A | 10/2018 |

(Continued)

*Primary Examiner* — Paul M. West
*Assistant Examiner* — Mark A Shabman
(74) *Attorney, Agent, or Firm* — Finnegan, Henderson, Farabow, Garrett & Dunner, LLP (57) ABSTRACT

According to one embodiment, a sensor includes a sensor part. The sensor part includes a supporter and a movable part. The movable part includes a movable member located around the supporter in a first plane, and a plurality of structure members located between the supporter and the movable member. The structure members have bent shapes. The structure members connect the movable member with the supporter. The movable member is capable of vibrating. The movable part has the supporter as a center of rotational symmetry. The movable part has a plurality of mirror planes. The mirror planes pass through the center of the rotational symmetry and cross the first plane.

19 Claims, 7 Drawing Sheets

(56) References Cited

U.S. PATENT DOCUMENTS

| | | | |
|---|---|---|---|
| 2016/0264401 | A1 | 9/2016 | Liukku et al. |
| 2018/0274923 | A1 | 9/2018 | Ikehashi |
| 2019/0049247 | A1* | 2/2019 | Huang ............... G01C 19/5712 |
| 2020/0284582 | A1 | 9/2020 | Kaji et al. |

FOREIGN PATENT DOCUMENTS

| | | |
|---|---|---|
| JP | 6627883 B2 | 1/2020 |
| JP | 2020-144065 A | 9/2020 |

\* cited by examiner

SENSOR AND ELECTRONIC DEVICE

CROSS-REFERENCE TO RELATED APPLICATIONS

This application is based upon and claims the benefit of priority from Japanese Patent Application No. 2021-029719, filed on Feb. 26, 2021; the entire contents of which are incorporated herein by reference.

FIELD

Embodiments described herein relate generally to a sensor and an electronic device.

BACKGROUND

There is a sensor such as a gyro sensor or the like. It is desirable to increase the detection accuracy of the sensor and an electronic device.

DETAILED DESCRIPTION

According to one embodiment, a sensor includes a sensor part. The sensor part includes a supporter and a movable part. The movable part includes a movable member located around the supporter in a first plane, and a plurality of structure members located between the supporter and the movable member. The structure members have bent shapes. The structure members connect the movable member with the supporter. The movable member is capable of vibrating. The movable part has the supporter as a center of rotational symmetry. The movable part has a plurality of mirror planes. The mirror planes pass through the center of the rotational symmetry and cross the first plane.

According to one embodiment, an electronic device includes the sensor described above, and a circuit controller configured to control a circuit based on a signal obtained from the sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
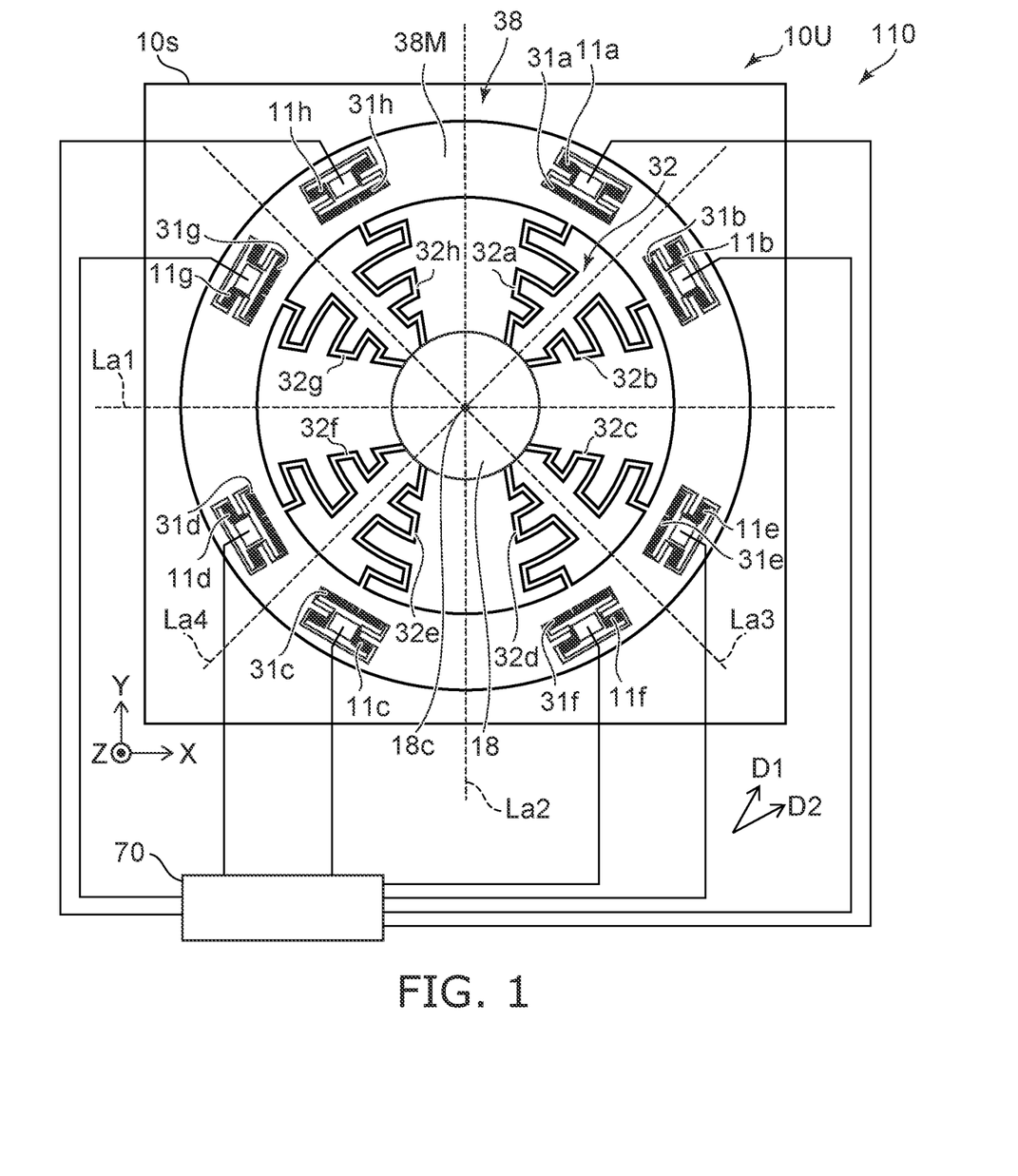
FIG. 1 is a schematic plan view illustrating a sensor according to a first embodiment.

FIG. 1 is a schematic plan view illustrating a sensor according to a first embodiment.

As shown in FIG. 1, the sensor 110 according to the embodiment includes a sensor part 10U. The sensor 110 may include a circuit part 70. The sensor part 10U includes a supporter 18 and a movable part 38.

The movable part 38 includes a movable member 38M, and multiple structure members 32 that have bent shapes. The movable member 38M is located around the supporter 18 in a first plane. The first plane is, for example, an X-Y plane. One direction along the X-Y plane is taken as an X-axis direction. A direction perpendicular to the X-axis direction along the X-Y plane is taken as a Y-axis direction. A direction perpendicular to the X-Y plane is taken as a Z-axis direction.

The multiple structure members 32 are located between the supporter 18 and the movable member 38M. In the example, the multiple structure members 32 include, for example, first to eighth structure members 32a to 32h. Each of the multiple structure members 32 has a bent shape. Each of the multiple structure members 32 includes, for example, a folded portion. Each of the multiple structure members 32 has, for example, a meandering shape. One of the bent multiple structure members 32 includes a folded portion. The multiple structure members 32 connect the movable member 38M with the supporter 18. The multiple structure members 32 are, for example, spring structure bodies.

The movable member 38M is ring-shaped. The movable member 38M can vibrate. As described below, the state of the vibration of the movable member 38M changes according to a rotational force applied to the sensor part 10U. The rotational force can be detected by detecting the change of the state of the vibration. The sensor 110 is, for example, a gyro sensor.

As shown in FIG. 1, the movable part 38 has the supporter 18 as a center of rotational symmetry. The supporter 18 includes a center 18c in the X-Y plane. The movable part 38 has the center 18c of the supporter 18 as the center of rotational symmetry. The center of the rotational symmetry of the movable part 38 corresponds to the center 18c of the supporter 18.

The movable part 38 has n-fold rotational symmetry. For example, "n" is 3, 4, or 6. In the example, the movable part 38 has four-fold rotational symmetry.

The movable part 38 has multiple mirror planes. For example, the movable part 38 has multiple mirror planes when viewed along the Z-axis direction. In the example, the multiple mirror planes include a first mirror plane La1 and a second mirror plane La2. In the example, the multiple mirror planes further include a third mirror plane La3 and a fourth mirror plane La4. The multiple mirror planes (the first mirror plane La1, the second mirror plane La2, the third mirror plane La3, and the fourth mirror plane La4) pass through the center (the center 18c) of the rotational symmetry. The multiple mirror planes (e.g., the first mirror plane La1 and the second mirror plane La2) cross the first plane (the X-Y plane). The multiple mirror planes cross each other.

The multiple structure members 32 include the multiple mirror planes (the first mirror plane La1 and the second mirror plane La2). In the example, a region that includes the first structure member 32a and the second structure member 32b is taken as a first component. A region that includes the third structure member 32c and the fourth structure member 32d is taken as a second component. A region that includes the fifth structure member 32e and the sixth structure member 32f is taken as a third component. A region that includes a seventh structure member 32g and an eighth structure member 32h is taken as a fourth component.

For example, one of the multiple structure members 32 has, as an axis of asymmetry, a radial direction (one direction along the X-Y plane) that passes through the center (the center 18c) of the rotational symmetry of the movable part 38. For example, the first structure member 32a and the second structure member 32b have mirror symmetry.

For example, a rotational force is applied to the sensor part 10U. The state of the vibration of the first structure member 32a when a clockwise rotational force is applied to the first structure member 32a is different from the state of the vibration of the first structure member 32a when a counterclockwise rotational force is applied to the first structure member 32a. The vibration state difference due to such a rotation direction difference is suppressed by the combination of the first structure member 32a and the second structure member 32b.

For example, a reference example may be considered in which all of the multiple structure members have the same shape. In the reference example, the movable part 38 does not include a mirror plane. In the reference example, the vibration state difference due to such a rotation direction difference is not canceled. The rotation direction difference causes a difference to occur in the detection of the displacement generated by the force application.

According to the embodiment, the vibration state difference that is due to the rotation direction difference is suppressed. A more accurate detection is possible thereby. According to the embodiment, a sensor can be provided in which the accuracy can be increased.

According to the embodiment, the number of multiple mirror planes is, for example, not less than 3 and not more than 6. When the number of multiple mirror planes is not less than 3, for example, an error between the displacement detection of the +X axis direction and the displacement detection of the −X axis direction does not occur easily. When the number of multiple mirror planes is not more than 2, for example, an error with respect to the displacement detection of the −X axis direction easily occurs. When the number of multiple mirror planes is not more than 2, for example, a change of the displacement of the movable part 38 that corresponds to an applied external force is different according to the direction of the external force. For example, when the number of multiple mirror planes is 4, the responsiveness difference of the change of the displacement of the movable part 38 corresponding to the applied external force that is caused by the direction of the external force is suppressed. For example, when the number of multiple mirror planes is 3 or 6, the responsiveness difference of the change of the displacement of the movable part 38 corresponding to the applied external force that is caused by the direction of the external force is further suppressed.

The number of the multiple structure members 32 is, for example, not less than 6.

A base body 10s is included as shown in FIG. 1. The supporter 18 is fixed to the base body 10s. For example, the base body 10s is along the first plane (the X-Y plane). When the movable part 38 has n-fold rotational symmetry, the base body 10s is an n-gon or a 2n-gon. The vibration state difference due to the rotation direction difference is further suppressed when the base body 10s has such a shape. Higher accuracy is easily obtained.

As shown in FIG. 1, the sensor part 10U includes multiple electrodes (e.g., first to eighth electrodes 11a to 11h). The direction from the center (the center 18c) of the rotational symmetry toward the first electrode 11a is along a first direction D1. The first direction D1 is along the first plane (the X-Y plane).

The direction from the center (the center 18c) of the rotational symmetry toward the second electrode 11b is along a second direction D2. The second direction D2 is along the first plane (the X-Y plane). The second direction D2 crosses the first direction D1.

For example, one of the multiple structure members 32 (e.g., the first structure member 32a) is between the supporter 18 and the first electrode 11a. The one of the multiple structure members 32 (the first structure member 32a) has the first direction D1 as an axis of asymmetry.

For example, another one of the multiple structure members 32 (e.g., the second structure member 32b) is between the supporter 18 and the second electrode 11b. The other one of the multiple structure members 32 (the second structure member 32b) has the second direction D2 as an axis of asymmetry. For example, the one of the multiple structure members 32 (e.g., the first structure member 32a) and the other one of the multiple structure members 32 (the second structure member 32b) have mirror symmetry.

The first electrode 11a is configured to detect a component along the first direction D1 of the vibration of the movable member 38M with higher sensitivity. The second electrode 11b is configured to detect a component along the second direction D2 of the vibration of the movable member 38M with higher sensitivity.

The movable member 38M includes a first counter part 31a and a second counter part 31b. The first counter part 31a faces the first electrode 11a. The first counter part 31a and the first electrode 11a mesh in a comb teeth configuration. The second counter part 31b faces the second electrode 11b. The second counter part 31b and the second electrode 11b mesh in a comb teeth configuration. For example, the electrical capacitance between the first electrode 11a and the first counter part 31a changes according to the vibration of the movable member 38M. For example, the electrical capacitance between the second electrode 11b and the second counter part 31b changes according to the vibration of the movable member 38M.

The rotation in any direction can be detected by detecting the state of the vibration along two different directions and by processing the detection results. When the "first electrode" is the first electrode 11a in the example of FIG. 1, the "second electrode" may be another electrode (e.g., the sixth electrode 11f, etc.).

A first signal that is obtained from the first electrode 11a corresponds to a rotational angular velocity applied to the movable member 38M. A second signal that is obtained from the second electrode 11b corresponds to the rotational angular velocity applied to the movable member 38M.

The first signal that is obtained from the first electrode 11a corresponds to the amplitude of the vibration in the first direction D1 generated in the movable member 38M vibrating along a direction crossing the first direction D1. The second signal that is obtained from the second electrode 11b corresponds to the amplitude of the vibration in the second direction D2 generated in the movable member 38M vibrating along a direction crossing the second direction D2.

For example, the vibration in the first direction D1 that is generated in the movable member 38M is based on a Coriolis force acting on the movable part 38. The vibration in the second direction D2 that is generated in the movable member 38M is based on a Coriolis force acting on the movable part 38. The first electrode 11a and the second electrode 11b are, for example, detection electrodes.

For example, the first electrode 11a and the second electrode 11b are electrically connected with the circuit part 70. The first signal that is obtained from the first electrode 11a may be processed by the circuit part 70. The second signal that is obtained from the second electrode 11b may be processed by the circuit part 70.

The circuit part 70 is configured to output information based on the first signal obtained from the first electrode 11a and the second signal obtained from the second electrode 11b. The information that is output is the rotational angular velocity and the rotation angle of the sensor part 10U. The rotation angle corresponds to summing (e.g., integrating) the rotational angular velocity.

In the example as shown in FIG. 1, the sensor part 10U includes the third electrode 11c and the fourth electrode 11d. The supporter 18 is between the third electrode 11c and the first electrode 11a in the first direction D1. The supporter 18 is between the fourth electrode 11d and the second electrode 11b in the second direction D2. The movable member 38M can vibrate along the first direction D1 according to a voltage applied to the third electrode 11c. The movable member 38M can vibrate along the second direction D2 according to a voltage applied to the fourth electrode 11d.

For example, the movable member 38M includes a third counter part 31c and a fourth counter part 31d. The third counter part 31c faces the third electrode 11c. The third counter part 31c and the third electrode 11c mesh in a comb teeth configuration. The fourth counter part 31d faces the fourth electrode 11d. The fourth counter part 31d and the fourth electrode 11d mesh in a comb teeth configuration. The movable member 38M vibrates due to an electrostatic force generated between the third electrode 11c and the third counter part 31c. The movable member 38M vibrates due to an electrostatic force generated between the fourth electrode 11d and the fourth counter part 31d. The third electrode 11c and the fourth electrode 11d are, for example, drive electrodes.

For example, the third electrode 11c and the fourth electrode 11d are electrically connected with the circuit part 70. A voltage (e.g., an alternating current voltage) is supplied from the circuit part 70 to the third and fourth electrodes 11c and 11d. The movable member 38M vibrates according to the voltage.

As shown in FIG. 1, the supporter 18 is located between the fifth electrode 11e and the seventh electrode 11g. The supporter 18 is located between the sixth electrode 11f and the eighth electrode 11h. For example, the direction from the seventh electrode 11g toward the fifth electrode 11e is along the X-Y plane and crosses the first direction D1 and the second direction D2. For example, the direction from the eighth electrode 11h toward the sixth electrode 11f is along the X-Y plane and crosses the first direction D1 and the second direction D2.

The fifth to eighth electrodes 11e to 11h are electrically connected with the circuit part 70. The seventh electrode 11g and the eighth electrode 11h are, for example, drive electrodes.

For example, the movable member 38M includes fifth to eighth counter parts 31e to 31h. The fifth counter part 31e faces the fifth electrode 11e. The fifth counter part 31e and the fifth electrode 11e mesh in a comb teeth configuration. A sixth counter part 31f faces the sixth electrode 11f. The sixth counter part 31f and the sixth electrode 11f mesh in a comb teeth configuration. A seventh counter part 31g faces the seventh electrode 11g. The seventh counter part 31g and the seventh electrode 11g mesh in a comb teeth configuration. The eighth counter part 31h faces the eighth electrode 11h. The eighth counter part 31h and the eighth electrode 11h mesh in a comb teeth configuration.

Figure 2:
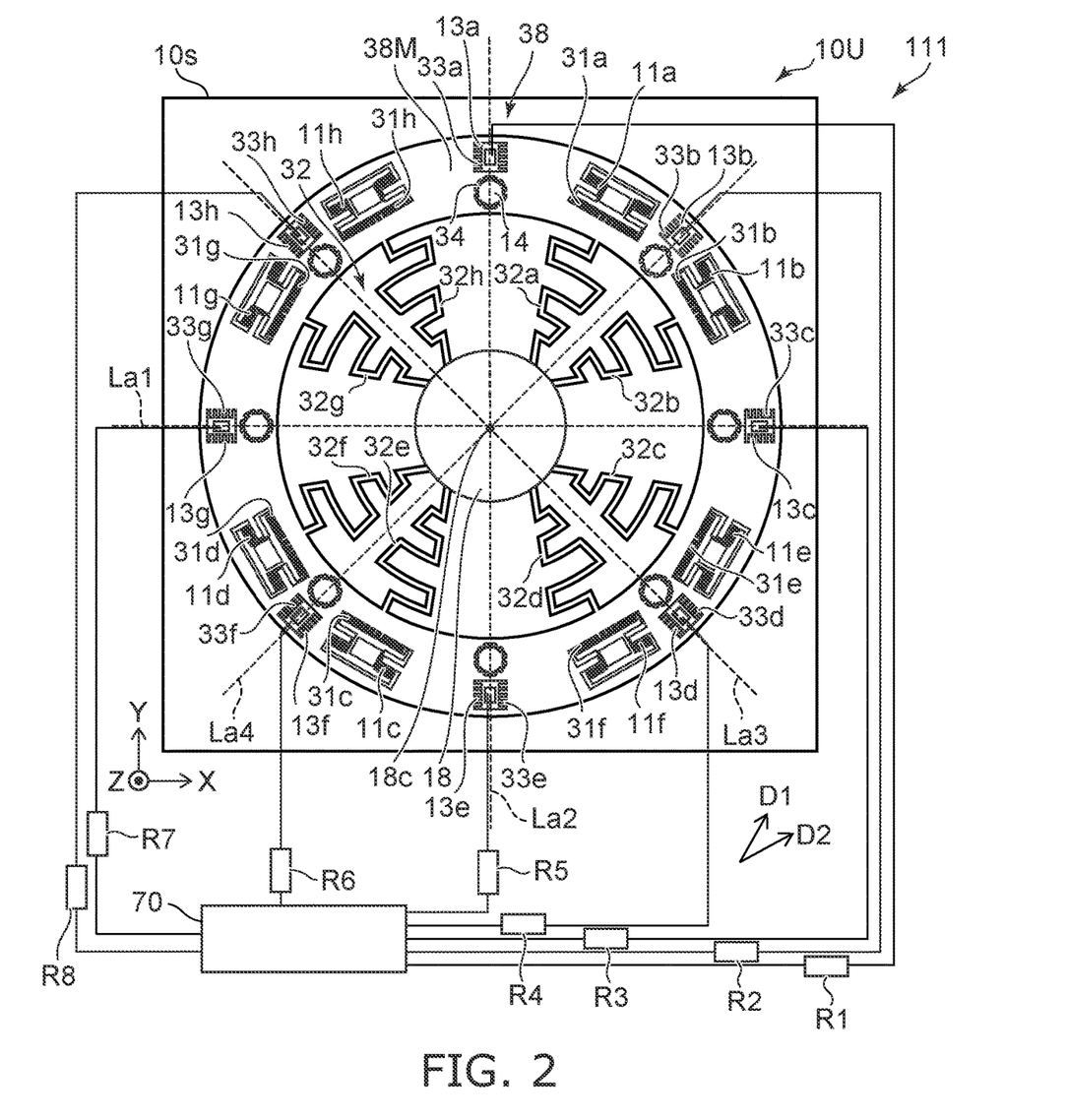
FIG. 2 is a schematic plan view illustrating a sensor according to the first embodiment.
Figure 3:
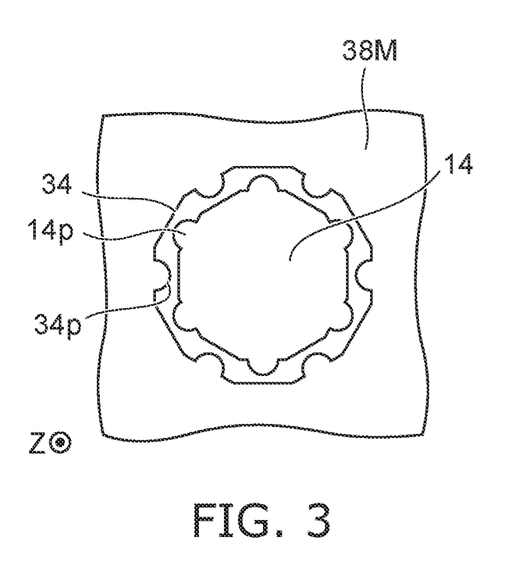
FIG. 3 is a schematic plan view illustrating the sensor according to the first embodiment.

FIGS. 2 and 3 are schematic plan views illustrating a sensor according to the first embodiment.

As shown in FIG. 2, the sensor 111 according to the embodiment also includes the sensor part 10U. The sensor 110 may include the circuit part 70. The sensor part 10U includes the supporter 18 and the movable part 38. In the sensor 111, the sensor part 10U includes multiple regulating electrodes (e.g., first to eighth regulating electrodes 13a to 13h, etc.). The sensor part 10U includes multiple resistances (e.g., first to eighth resistances R1 to R8, etc.). The movable member 38M includes multiple regulating counter parts (e.g., first to eighth regulating counter parts 33a to 33h, etc.). Otherwise, the configuration of the sensor 111 may be similar to the configuration of the sensor 110.

In the sensor 111, the sensor part 10U includes the first regulating electrode 13a and the first resistance R1. The first resistance R1 is electrically connected with the first regulating electrode 13a. The orientation from the supporter 18 toward the first regulating electrode 13a is along the first plane (the X-Y plane). The vibration state of the movable member 38M is changeable according to a voltage applied to the first regulating electrode 13a and the first resistance R1. For example, a voltage is applied from the circuit part 70 to the first regulating electrode 13a and the first resistance R1. The vibration state of the movable member 38M is changed by the voltage. For example, the first regulating electrode 13a and the first resistance R1 can function as an electrical damper. For example, the time constant of the vibration can be modified by the first regulating electrode 13a, the first resistance R1, and the voltage. The first resistance R1 may be, for example, a variable resistance.

The movable member 38M includes the first regulating counter part 33a. The first regulating counter part 33a faces the first regulating electrode 13a. The first regulating electrode 13a and the first regulating counter part 33a mesh in a comb teeth configuration. The movable member 38M includes the second to eighth regulating counter parts 33b to 33h. The second to eighth regulating counter parts 33b to 33h respectively face the second to eighth regulating electrodes 13b to 13h. The second to eighth regulating electrodes 13b to 13h and the second to eighth regulating counter parts 33b to 33h respectively mesh in comb teeth configurations.

As shown in FIG. 2, the sensor part 10U may include a fixed part 14. For example, multiple fixed parts 14 are fixed to the base body 10s.

FIG. 3 is an enlarged illustration of a region including the fixed part 14. As shown in FIG. 3, the movable member 38M includes a fixed counter part 34. The fixed counter part 34 faces the fixed part 14. In the example, the fixed counter part 34 is located around the fixed part 14. The fixed counter part 34 is a region of a portion of the movable member 38M.

In the example as shown in FIG. 3, at least one of the fixed part 14 or the fixed counter part 34 includes a protrusion. For example, the fixed part 14 includes a protrusion 14p. For example, the fixed counter part 34 includes a protrusion 34p.

Figure 4:
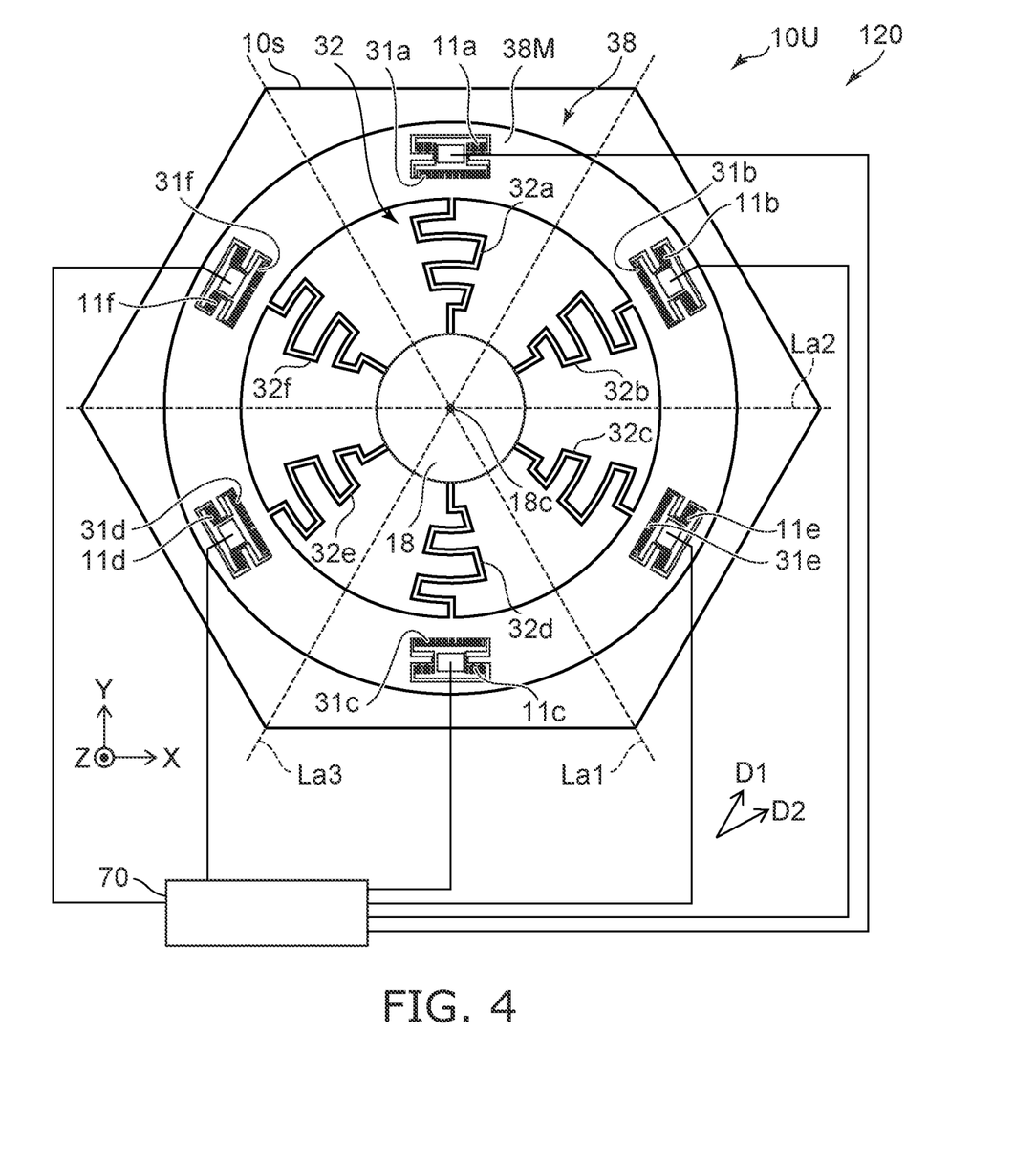
FIG. 4 is a schematic plan view illustrating a sensor according to the first embodiment.

FIG. 4 is a schematic plan view illustrating a sensor according to the first embodiment.

As shown in FIG. 4, the sensor 120 according to the embodiment includes the sensor part 10U. The sensor 110 may include the circuit part 70. In the sensor 120 as well, the sensor part 10U includes the supporter 18 and the movable part 38.

The movable part 38 includes the movable member 38M and the bent multiple structure members 32. The movable member 38M is located around the supporter 18 in the first plane (the X-Y plane). The multiple structure members 32 are located between the supporter 18 and the movable member 38M. In the example, the multiple structure members 32 include the first to sixth structure members 32a to 32f.

In the sensor 120 as well, the movable part 38 has the supporter 18 as a center of rotational symmetry. The movable part 38 has the center 18c of the supporter 18 as a center of rotational symmetry. The movable part 38 has n-fold rotational symmetry. In the example, the movable part 38 has three-fold rotational symmetry. The movable part 38 has multiple mirror planes. In the example, the multiple mirror planes include the first mirror plane La1, the second mirror plane La1, and the third mirror plane La3. The multiple mirror planes (the first to third mirror planes La1 to La3) pass through the center (the center 18c) of the rotational symmetry.

In the sensor 120 as well, the vibration state difference that is due to the rotation direction difference is suppressed. A more accurate detection is possible thereby. According to the embodiment, a sensor can be provided in which the accuracy can be increased.

The configuration described with reference to the sensor 110 is applicable to the sensor 120. For example, as shown in FIG. 4, the sensor part 10U includes the base body 10s. The supporter 18 is fixed to the base body 10s. In the example, the movable part 38 has three-fold rotational symmetry. The base body 10s is hexagonal. When the base body 10s has such a shape, the vibration state difference that is due to the rotation direction difference is further suppressed. Higher accuracy is easily obtained.

As shown in FIG. 4, the sensor part 10U includes multiple electrodes (e.g., the first to sixth electrodes 11a to 11f). The direction from the center (the center 18c) of the rotational symmetry toward the first electrode 11a is along the first direction D1. The direction from the center (the center 18c) of the rotational symmetry toward the second electrode 11b is along the second direction D2. The second direction D2 is along the first plane (the X-Y plane). The second direction D2 crosses the first direction D1.

For example, one of the multiple structure members 32 (e.g., the first structure member 32a) is between the supporter 18 and the first electrode 11a. The one of the multiple structure members 32 (the first structure member 32a) has the first direction D1 as an axis of asymmetry.

For example, another one of the multiple structure members 32 (e.g., the second structure member 32b) is between the supporter 18 and the second electrode 11b. The other one of the multiple structure members 32 (the second structure member 32b) has the second direction D2 as an axis of asymmetry. For example, the one of the multiple structure members 32 (e.g., the first structure member 32a) and the other one of the multiple structure members 32 (the second structure member 32b) have mirror symmetry.

The first electrode 11a is configured to detect a component along the first direction D1 of the vibration of the movable member 38M. The second electrode 11b is configured to detect a component along the second direction D2 of the vibration of the movable member 38M.

The movable member 38M includes the first to sixth counter parts 31a to 31f. The first to sixth counter parts 31a to 31f respectively face the first to sixth electrodes 11a to 11f.

The first to sixth counter parts 31a to 31f and the first to sixth electrodes 11a to 11f respectively mesh in comb teeth configurations.

In the example as shown in FIG. 4, the sensor part 10U includes the third electrode 11c and the fourth electrode 11d. The supporter 18 is between the third electrode 11c and the first electrode 11a in the first direction D1. The supporter 18 is between the fourth electrode 11d and the second electrode 11b in the second direction D2. The movable member 38M can vibrate along the first direction D1 according to a voltage applied to the third electrode 11c. The movable member 38M can vibrate along the second direction D2 according to a voltage applied to the fourth electrode 11d.

Figure 5:
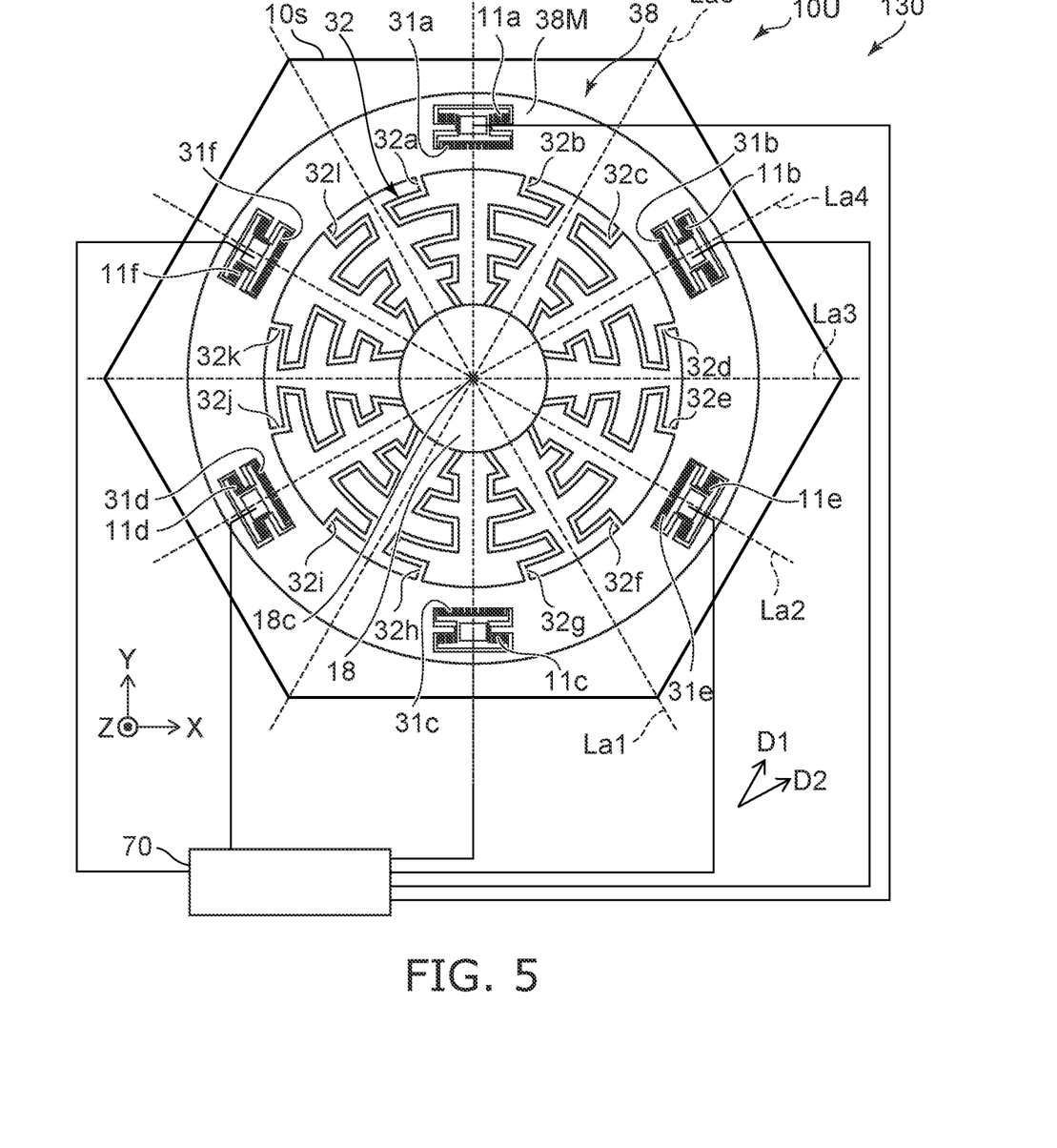
FIG. 5 is a schematic plan view illustrating a sensor according to the first embodiment.

FIG. 5 is a schematic plan view illustrating a sensor according to the first embodiment.

As shown in FIG. 5, the sensor 130 according to the embodiment includes the sensor part 10U. The sensor 110 may include the circuit part 70. In the sensor 130 as well, the sensor part 10U includes the supporter 18 and the movable part 38.

The movable part 38 includes the movable member 38M and the bent multiple structure members 32. The movable member 38M is located around the supporter 18 in the first plane (the X-Y plane). The multiple structure members 32 are located between the supporter 18 and the movable member 38M. In the example, the multiple structure members 32 include the first to twelfth structure members 32a to 32l.

In the sensor 130 as well, the movable part 38 has the supporter 18 as a center of rotational symmetry. The movable part 38 has the center 18c of the supporter 18 as a center of rotational symmetry. The movable part 38 has n-fold rotational symmetry. In the example, the movable part 38 has three-fold rotational symmetry. The movable part 38 has multiple mirror planes. In the example, the multiple mirror planes include the first mirror plane La1, the second mirror plane La1, the third mirror plane La3, the fourth mirror plane La4, a fifth mirror plane La5, and a sixth mirror plane La6. The multiple mirror planes (the first to sixth mirror planes La1 to La6) pass through the center (the center 18c) of the rotational symmetry.

In the sensor 130 as well, the vibration state difference that is due to the rotation direction difference is suppressed. A more accurate detection is possible thereby. According to the embodiment, a sensor can be provided in which the accuracy can be increased.

For example, the configuration described with reference to the sensor 111 is applicable to the sensors 120 and 130. For example, the first to sixth regulating electrodes 13a to 13f and the first to sixth regulating counter parts 33a to 33f may be included in the sensors 120 and 130. The fixed part 14 and the fixed counter part 34 may be included in the sensors 120 and 130.

In the sensors 110, 111, 120, and 130, the circuit part 70 may be provided separately from the sensors 110, 111, 120, and 130.

For example, according to the embodiment, a vibration characteristic difference along a direction that crosses the excitation axis can be suppressed. For example, a response characteristic difference along the displacement direction is suppressed.

Second Embodiment

A second embodiment relates to an electronic device.

Figure 6:
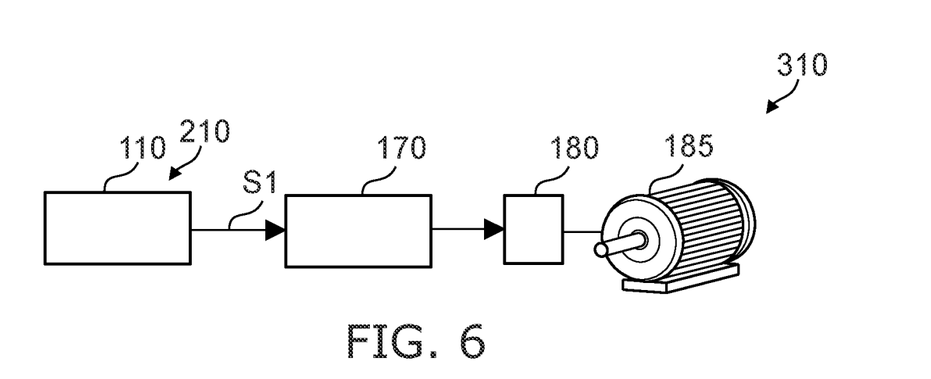
FIG. 6 is a schematic view illustrating an electronic device according to a second embodiment.

FIG. 6 is a schematic view illustrating the electronic device according to the second embodiment.

As shown in FIG. 6, the electronic device 310 according to the embodiment includes a circuit controller 170 and a sensor according to an embodiment. In the example of FIG. 6, the sensor 110 (or a sensor device 210) is illustrated as the sensor. The circuit controller 170 is configured to control a circuit 180 based on a signal S1 obtained from the sensor. The circuit 180 is, for example, a control circuit of a drive device 185, etc. According to the embodiment, the circuit 180 for controlling the drive device 185, etc., can be controlled with high accuracy based on a highly-accurate detection result.

FIGS. 7A to 7H are schematic views illustrating applications of the electronic device.

Figure 7A:
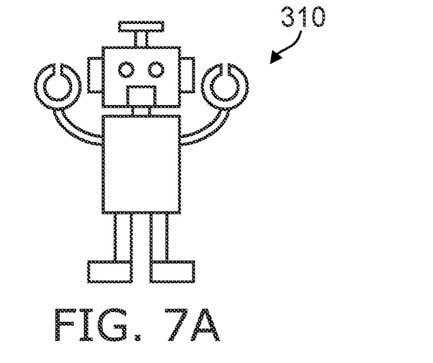
FIGS. 7A to 7H are schematic views illustrating applications of the electronic device.
Figure 7B:
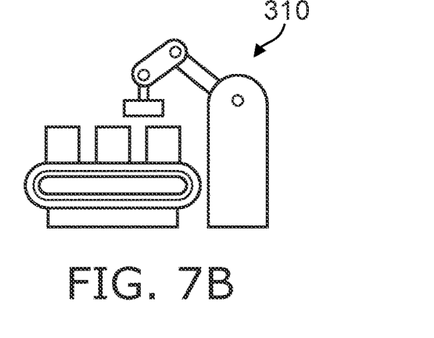
Figure 7C:
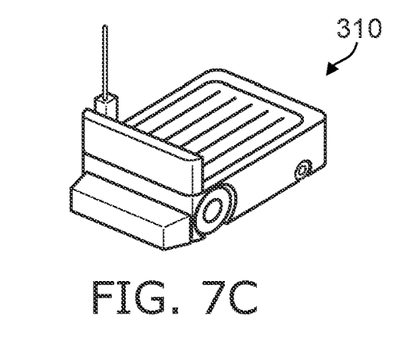
Figure 7D:
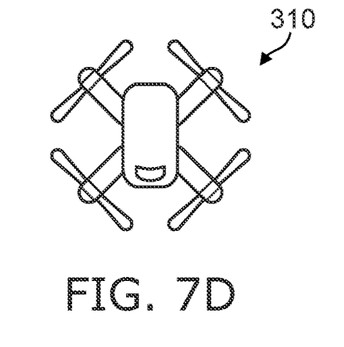
Figure 7E:
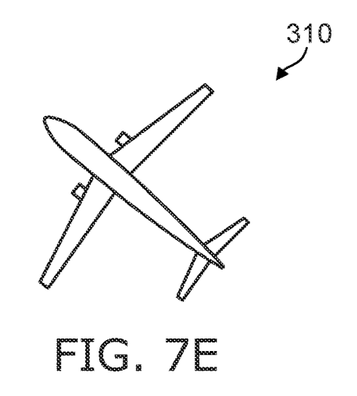
Figure 7F:
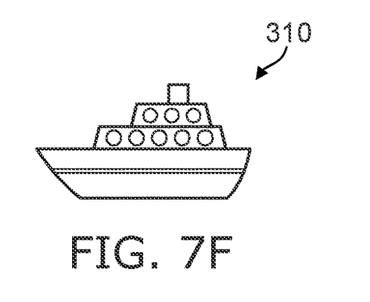
Figure 7G:
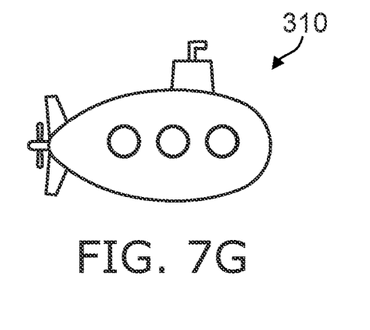
Figure 7H:
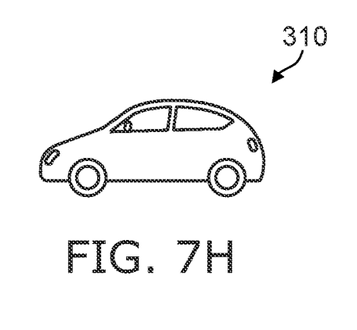

As shown in FIG. 7A, the electronic device 310 may be at least a portion of a robot. As shown in FIG. 7B, the electronic device 310 may be at least a portion of a machining robot provided in a manufacturing plant, etc. As shown in FIG. 7C, the electronic device 310 may be at least a portion of an automatic guided vehicle inside a plant, etc. As shown in FIG. 7D, the electronic device 310 may be at least a portion of a drone (an unmanned aircraft). As shown in FIG. 7E, the electronic device 310 may be at least a portion of an airplane. As shown in FIG. 7F, the electronic device 310 may be at least a portion of a ship. As shown in FIG. 7G, the electronic device 310 may be at least a portion of a submarine. As shown in FIG. 7H, the electronic device 310 may be at least a portion of an automobile. The electronic device 310 may include, for example, at least one of a robot or a mobile body.

Embodiments may include the following configurations (e.g., technological proposals).

Configuration 1

A sensor, comprising:
a sensor part,
the sensor part including a supporter and a movable part,
the movable part including
a movable member located around the supporter in a first plane, and
a plurality of structure members located between the supporter and the movable member,
the plurality of structure members having bent shapes,
the plurality of structure members connecting the movable member with the supporter,
the movable member being capable of vibrating,
the movable part having the supporter as a center of rotational symmetry,
the movable part having a plurality of mirror planes,
the plurality of mirror planes passing through the center of the rotational symmetry and crossing the first plane.

Configuration 2

The sensor according to Configuration 1, wherein
a number of the plurality of mirror planes is not less than 3 and not more than 6.

Configuration 3

The sensor according to Configuration 1 or 2, wherein
a number of the plurality of structure members is not less than 6.

Configuration 4

The sensor according to any one of Configurations 1 to 3, wherein
the movable part has n-fold rotational symmetry, and
n is 3, 4, or 6.

Configuration 5

The sensor according to Configuration 4, wherein
the sensor part includes a base body,
the supporter is fixed to the base body, and
the base body is an n-gon or a 2n-gon.

Configuration 6

The sensor according to any one of Configurations 1 to 5, wherein
the sensor part further includes a first electrode and a second electrode,
a direction from the center of the rotational symmetry toward the first electrode is along a first direction,
the first direction is along the first plane,
a direction from the center of the rotational symmetry toward the second electrode is along a second direction, and
the second direction is along the first plane and crosses the first direction.

Configuration 7

The sensor according to Configuration 6, wherein
one of the plurality of structure members is between the supporter and the first electrode, and
the one of the plurality of structure members has the first direction as an axis of asymmetry.

Configuration 8

The sensor according to Configuration 6 or 7, wherein
the first electrode is configured to detect a component of a vibration of the movable member along the first direction, and
the second electrode is configured to detect a component of the vibration of the movable member along the second direction.

Configuration 9

The sensor according to Configuration 6 or 7, wherein
a first signal obtained from the first electrode corresponds to a rotational angular velocity applied to the movable member, and
a second signal obtained from the second electrode corresponds to the rotational angular velocity.

Configuration 10

The sensor according to Configuration 6 or 7, wherein
a first signal obtained from the first electrode corresponds to an amplitude of a vibration in the first direction generated in the movable member vibrating along a direction crossing the first direction, and
a second signal obtained from the second electrode corresponds to an amplitude of a vibration in the second direction generated in the movable member vibrating along a direction crossing the second direction.

Configuration 11

The sensor according to any one of Configurations 6 to 10, wherein
the movable member includes a first counter part and a second counter part,
the first counter part faces the first electrode,
the first counter part and the first electrode mesh in a comb teeth configuration,
the second counter part faces the second electrode, and
the second counter part and the second electrode mesh in a comb teeth configuration.

Configuration 12

The sensor according to any one of Configurations 6 to 11, wherein
the sensor part further includes a third electrode and a fourth electrode,
the supporter is between the third electrode and the first electrode in the first direction,
the supporter is between the fourth electrode and the second electrode in the second direction,
the movable member is capable of vibrating along the first direction according to a voltage applied to the third electrode, and the movable member is capable of vibrating along the second direction according to a voltage applied to the fourth electrode.
Configuration 13

The sensor according to Configuration 12, wherein
the movable member includes a third counter part and a fourth counter part,
the third counter part faces the third electrode,
the third counter part and the third electrode mesh in a comb teeth configuration,
the fourth counter part faces the fourth electrode, and
the fourth counter part and the fourth electrode mesh in a comb teeth configuration.
Configuration 14

The sensor according to any one of Configurations 1 to 13, wherein
the sensor part further includes a first regulating electrode and a first resistance,
the first resistance is electrically connected with the first regulating electrode,
an orientation from the supporter toward the first regulating electrode is along the first plane, and
a vibration state of the movable member is changeable according to a voltage applied to the first regulating electrode and the first resistance.
Configuration 15

The sensor according to Configuration 13, wherein
the movable member includes a first regulating counter part facing the first regulating electrode, and
the first regulating electrode and the first regulating counter part mesh in a comb teeth configuration.
Configuration 16

The sensor according to any one of Configurations 1 to 15, wherein
the sensor part further includes a fixed part,
the movable member further includes a fixed counter part facing the fixed part, and
at least one of the fixed part or the fixed counter part includes a protrusion.
Configuration 17

The sensor according to Configuration 16, wherein
the fixed counter part is located around the fixed part.
Configuration 18

The sensor according to any one of Configurations 1 to 17, further comprising:
a circuit part electrically connected with the first and second electrodes,
the circuit part being configured to output information based on a signal obtained from the first electrode and based on a signal obtained from the second electrode.
Configuration 19

An electronic device, comprising:
the sensor according to any one of Configurations 1 to 18; and
a circuit controller configured to control a circuit based on a signal obtained from the sensor.
Configuration 20

The electronic device according to Configuration 19, wherein
the electronic device includes at least one of a robot or a mobile body.

According to embodiments, a sensor and an electronic device can be provided in which the accuracy can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor parts, supporters, movable parts, movable members, electrodes, counter parts, circuit parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, and electronic devices practicable by an appropriate design modification by one skilled in the art based on the sensors, and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A sensor, comprising:
a sensor part,
the sensor part including a supporter and a movable part,
the movable part including
a movable member located around the supporter in a first plane, and
a plurality of structure members located between the supporter and the movable member,
the plurality of structure members having bent shapes,
the plurality of structure members connecting the movable member with the supporter,
the movable member being capable of vibrating,
the movable part having the supporter as a center of rotational symmetry,
the movable part having a plurality of mirror planes,
the plurality of mirror planes passing through the center of the rotational symmetry and crossing the first plane, wherein
the sensor part further includes a first electrode and a second electrode,
a direction from the center of the rotational symmetry toward the first electrode is along a first direction,
the first direction is along the first plane,
a direction from the center of the rotational symmetry toward the second electrode is along a second direction,
the second direction is along the first plane and crosses the first direction,
the movable member includes a first counter part and a second counter part,
the first counter part faces the first electrode, the first counter part and the first electrode mesh in a comb teeth configuration,
the second counter part faces the second electrode, and
the second counter part and the second electrode mesh in a comb teeth configuration.

2. The sensor according to claim 1, wherein
a number of the plurality of mirror planes is not less than 3 and not more than 6.

3. The sensor according to claim 1, wherein
a number of the plurality of structure members is not less than 6.

4. The sensor according to claim 1, wherein
the movable part has n-fold rotational symmetry, and
n is 3, 4, or 6.

5. The sensor according to claim 4, wherein
the sensor part includes a base body,
the supporter is fixed to the base body, and
the base body is an n-gon or a 2n-gon.

6. The sensor according to claim 1, wherein
one of the plurality of structure members is between the supporter and the first electrode, and
the one of the plurality of structure members has the first direction as an axis of asymmetry.

7. The sensor according to claim 1, wherein
the first electrode is configured to detect a component of a vibration of the movable member along the first direction, and
the second electrode is configured to detect a component of the vibration of the movable member along the second direction.

8. The sensor according to claim 1, wherein
a first signal obtained from the first electrode corresponds to a rotational angular velocity applied to the movable member, and
a second signal obtained from the second electrode corresponds to the rotational angular velocity.

9. The sensor according to claim 1, wherein
a first signal obtained from the first electrode corresponds to an amplitude of a vibration in the first direction generated in the movable member vibrating along a direction crossing the first direction, and
a second signal obtained from the second electrode corresponds to an amplitude of a vibration in the second direction generated in the movable member vibrating along a direction crossing the second direction.

10. The sensor according to claim 1, wherein
the sensor part further includes a fixed part,
the movable member further includes a fixed counter part facing the fixed part, and
at least one of the fixed part or the fixed counter part includes a protrusion.

11. The sensor according to claim 10, wherein
the fixed counter part is located around the fixed part.

12. The sensor according to claim 1, further comprising:
a circuit part electrically connected with the first and second electrodes,
the circuit part being configured to output information based on a signal obtained from the first electrode and based on a signal obtained from the second electrode.

13. An electronic device, comprising:
the sensor according to claim 1; and
a circuit controller configured to control a circuit based on a signal obtained from the sensor.

14. The device according to claim 13, wherein
the electronic device includes at least one of a robot or a mobile body.

15. A sensor, comprising:
sensor part,
the sensor part including a supporter and a movable part,
the movable part including
a movable member located around the supporter in a first plane, and
a plurality of structure members located between the supporter and the movable member,
the plurality of structure members having bent shapes,
the plurality of structure members connecting the movable member with the supporter,
the movable member being capable of vibrating,
the movable part having the supporter as a center of rotational symmetry,
the movable part having a plurality of mirror planes,
the plurality of mirror planes passing through the center of the rotational symmetry and crossing the first plane,
wherein
the sensor part further includes a first electrode and a second electrode,
a direction from the center of the rotational symmetry toward the first electrode is along a first direction,
the first direction is along the first plane,
a direction from the center of the rotational symmetry toward the second electrode is along a second direction,
the second direction is along the first plane and crosses the first direction,
the sensor part further includes a third electrode and a fourth electrode,
the supporter is between the third electrode and the first electrode in the first direction,
the supporter is between the fourth electrode and the second electrode in the second direction,
the movable member is capable of vibrating along the first direction according to a voltage applied to the third electrode, and
the movable member is capable of vibrating along the second direction according to a voltage applied to the fourth electrode.

16. The sensor according to claim 15, wherein
the movable member includes a third counter part and a fourth counter part,
the third counter part faces the third electrode,
the third counter part and the third electrode mesh in a comb teeth configuration,
the fourth counter part faces the fourth electrode, and
the fourth counter part and the fourth electrode mesh in a comb teeth configuration.

17. The sensor according to claim 16, wherein
the movable member includes a first regulating counter part facing the first regulating electrode, and
the first regulating electrode and the first regulating counter part mesh in a comb teeth configuration.

18. A sensor, comprising:
a sensor part,
the sensor part including a supporter and a movable part,
the movable part including
a movable member located around the supporter in a first plane, and
a plurality of structure members located between the supporter and the movable member,
the plurality of structure members having bent shapes,
the plurality of structure members connecting the movable member with the supporter,
the movable member being capable of vibrating, the movable part having the supporter as a center of rotational symmetry, the movable part having a plurality of mirror planes, the plurality of mirror planes passing through the center of the rotational symmetry and crossing the first plane, wherein the sensor part further includes a first regulating electrode and a first resistance, the first resistance is electrically connected with the first regulating electrode, an orientation from the supporter toward the first regulating electrode is along the first plane, and a vibration state of the movable member is changeable according to a voltage applied to the first regulating electrode and the first resistance.

19. The sensor according to claim 18, wherein the sensor part further includes a first electrode and a second electrode, a direction from the center of the rotational symmetry toward the first electrode is along a first direction, the first direction is along the first plane, a direction from the center of the rotational symmetry toward the second electrode is along a second direction, and the second direction is along the first plane and crosses the first direction.

* * * * *